US010615923B2

(12) United States Patent
You et al.

(10) Patent No.: US 10,615,923 B2
(45) Date of Patent: Apr. 7, 2020

(54) METHOD AND APPARATUS FOR PROCESSING HYBRID AUTOMATIC REPEAT REQUEST PROCESS IN COMMUNICATION SYSTEM

(71) Applicant: ELECTRONICS AND TELECOMMUNICATIONS RESEARCH INSTITUTE, Daejeon (KR)

(72) Inventors: Duk Hyun You, Daejeon (KR); Jun Woo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 15/903,634

(22) Filed: Feb. 23, 2018

(65) Prior Publication Data

US 2018/0248659 A1    Aug. 30, 2018

(30) Foreign Application Priority Data

Feb. 24, 2017   (KR) .................. 10-2017-0024850
Feb. 13, 2018   (KR) .................. 10-2018-0017952

(51) Int. Cl.
    *H04W 4/00*     (2018.01)
    *H04L 1/18*     (2006.01)
    *H04L 1/00*     (2006.01)

(52) U.S. Cl.
    CPC .......... *H04L 1/1816* (2013.01); *H04L 1/0045* (2013.01); *H04L 1/1822* (2013.01); *H04L 1/1887* (2013.01); *H04L 1/1896* (2013.01); *H04L 1/0033* (2013.01); *H04L 1/1829* (2013.01)

(58) Field of Classification Search
    CPC .................................... H04L 1/1816
    See application file for complete search history.

(56) References Cited

U.S. PATENT DOCUMENTS

| 9,537,615 B2* | 1/2017 | Zhu | H04L 1/1822 |
| 9,912,504 B2* | 3/2018 | Krzymien | H04L 1/1812 |
| 2006/0092973 A1* | 5/2006 | Petrovic | H04L 1/1822 370/469 |
| 2008/0019434 A1* | 1/2008 | Kim | H04B 1/71072 375/232 |
| 2008/0059859 A1 | 3/2008 | Marinier et al. | |
| 2008/0198803 A1* | 8/2008 | Lee | H04L 1/04 370/329 |
| 2009/0197608 A1 | 8/2009 | Chin et al. | |
| 2009/0313515 A1* | 12/2009 | Barve | H04L 1/1812 714/748 |

(Continued)

*Primary Examiner* — Guang W Li
(74) *Attorney, Agent, or Firm* — Rabin & Berdo, P.C.

(57) ABSTRACT

Method and apparatus for processing hybrid automatic repeat request process in communication system are disclosed. An operation method of a communication node comprises configuring one or more hybrid automatic repeat request (HARQ) groups; and deploying at least one HARQ process identifier (ID) in each of the one or more HARQ groups, wherein each of the one or more HARQ groups includes a HARQ memory group, a memory controller group controlling the HARQ memory group, and a decoder group performing a decoding based on data stored in the HARQ memory group by accessing the HARQ memory group through the memory controller group. Therefore, performance of the communication system may be enhanced.

19 Claims, 10 Drawing Sheets

(56) References Cited

U.S. PATENT DOCUMENTS

| | | | |
|---|---|---|---|
| 2010/0254327 A1* | 10/2010 | McBeath | H04L 1/1812 370/329 |
| 2010/0254328 A1 | 10/2010 | McBeath et al. | |
| 2010/0312994 A1* | 12/2010 | McBeath | H04L 1/1822 712/220 |
| 2010/0325502 A1* | 12/2010 | Lindskog | H04L 1/1657 714/748 |
| 2011/0145669 A1 | 6/2011 | Kim et al. | |
| 2011/0249601 A1 | 10/2011 | Seo et al. | |
| 2012/0230245 A1* | 9/2012 | Ostergaard | H04W 72/0426 370/315 |
| 2013/0215941 A1* | 8/2013 | Cho | H04L 1/0054 375/222 |
| 2013/0225184 A1* | 8/2013 | Liu | H04W 72/042 455/450 |
| 2014/0086302 A1* | 3/2014 | Felix | H04L 1/005 375/240 |
| 2015/0109996 A1* | 4/2015 | Lee | H04L 1/1825 370/328 |
| 2015/0113360 A1* | 4/2015 | Lee | H04L 1/1864 714/776 |
| 2015/0256297 A1* | 9/2015 | Yang | H04L 1/1896 370/216 |
| 2016/0227425 A1 | 8/2016 | Kim et al. | |
| 2016/0241362 A1* | 8/2016 | El-Khamy | H04L 1/1835 |
| 2017/0279563 A1 | 9/2017 | Seo et al. | |
| 2018/0014298 A1* | 1/2018 | Sun | H04W 72/0446 |
| 2018/0234359 A1* | 8/2018 | Hosseini | H04L 49/9052 |
| 2019/0053230 A1* | 2/2019 | Andersson | H04L 1/1887 |

* cited by examiner

METHOD AND APPARATUS FOR PROCESSING HYBRID AUTOMATIC REPEAT REQUEST PROCESS IN COMMUNICATION SYSTEM

CROSS-REFERENCE TO RELATED APPLICATIONS

This application claims priorities to Korean Patent Applications No. 10-2017-0024850 filed on Feb. 24, 2017 and No. 10-2018-0017952 filed on Feb. 13, 2018 in the Korean Intellectual Property Office (KIPO), the entire contents of which are hereby incorporated by reference.

BACKGROUND

1. Technical Field

The present disclosure relates to a hybrid automatic repeat request (HARQ) technique in a communication system, and more specifically, to a technique for independently processing a HARQ process in order to satisfy requirements of high data throughput and low latency.

2. Related Art

In a communication system, a data packet may be transmitted from a transmitter (e.g., a base station) to a receiver (e.g., a terminal) over a radio channel. An error may occur in the data packet received at the receiver depending on the state of the radio channel (e.g., the quality change of the radio channel). A forward error correction (FEC) technique may be used to recover the reception error. If the FEC technique is used in the communication system, the transmitter may transmit a data packet containing redundancy and the receiver may recover the reception error using the redundancy in the presence of the reception error in the received data packet.

Also, an automatic repeat request (ARQ) technique may be used to recover the reception error. When the ARQ technique is used in the communication system, the transmitter may transmit a data packet including a cyclic redundancy check (CRC), and the receiver may check the presence of an error based on the CRC included in the received data packet. If there is no error in the received data packet, the receiver may transmit an acknowledgment (ACK) to the transmitter. On the other hand, if there is an error in the received data packet, the receiver may transmit a negative ACK (NACK) to the transmitter. The transmitter that received the NACK may retransmit the same data packet to the receiver.

Also, a hybrid ARQ (HARQ) technique, which is a combination of the FEC technique and the ARQ technique, may be used in the communication system. A HARQ retransmission procedure may be performed based on a chase combining (CC) scheme or an incremental redundancy (IR) scheme. When the HARQ retransmission procedure according to the CC scheme is performed, the transmitter may repeatedly transmit the same data packet. In this case, the receiver may reproduce the original data packet by combining the same received data packets. When the HARQ retransmission procedure according to the IR scheme is performed, the transmitter may transmit data packets having different redundancy versions (RVs). The receiver may reproduce the original data packet by combining the received data packets having different RVs.

Meanwhile, when the HARQ retransmission procedure is performed, a transport block (TB) corresponding to an HARQ process identifier may be stored in an HARQ memory (e.g., a HARQ buffer). The size of the HARQ memory may increase in order to meet the requirements of high data throughput in the communication systems. However, when the size of the HARQ memory increases, the requirements of low latency may not be satisfied. Therefore, there is a need for the HARQ technique to meet the requirements of high data throughput and low latency both.

SUMMARY

Accordingly, embodiments of the present disclosure provide a method and an apparatus for independently processing a HARQ process in a communication system.

In order to achieve the objective of the present disclosure, an operation method of a first communication node may comprise configuring one or more hybrid automatic repeat request (HARQ) groups; and deploying at least one HARQ process identifier (ID) in each of the one or more HARQ groups, wherein each of the one or more HARQ groups includes a HARQ memory group, a memory controller group controlling the HARQ memory group, and a decoder group performing a decoding based on data stored in the HARQ memory group by accessing the HARQ memory group through the memory controller group, and wherein an deployment interval of HARQ process IDs belonging to each of the one or more HARQ groups is equal to or greater than a HARQ processing time of a single HARQ process. Here, a minimum value of the HARQ processing time may be a processing time of the HARQ memory.

Here, parameters used for configuring the one or more HARQ groups are received through at least one of a radio resource control (RRC) signaling procedure, a system information transmission procedure, and a control information transmission procedure.

Here, the one or more HARQ groups are configured based on a total number of the one or more HARQ groups, a total number of HARQ process IDs belonging to the one or more HARQ groups, a total number of decoders belonging to the one or more HARQ groups, an deployment interval between of the HARQ groups, at least one HARQ process ID deployed in the one or more HARQ groups, and the HARQ processing time.

Here, total methods for deploying the HARQ process ID may not be disclosed in the present invention because the methods for deploying the HARQ process ID may be infinite. Therefore, for easy of explanation, embodiments of the present invention may be explained in the most complicated situation in terms of the HARQ. The most complicated situation may be that the maximum allowable HARQ process IDs are deployed and management operations for retransmission are necessary per the deployed total HARQ process IDs because negative acknowledgements (NACKs) are occurred in the deployed total HARQ process IDs. In this case, even when it is assumed that the HARQ process ID per a transmission time interval (TTI) is deployed by an increase manner or decrease manner, it does not loss the generality because the maximum allowable HARQ process IDs are deployed. Therefore, the embodiments of the present inventions may be explained in the most complicated situation if there is no mention. However, this assumption may be for ease of explanation, and the embodiments of the present invention may not be limited to the above-described assumption.

Here, when the HARQ processing time is L, a total number of the one or more HARQ groups is K, an deployment interval of the HARQ group is s, a total number of the HARQ process IDs is N, and an arbitrary HARQ process ID among N HARQ process IDs is j, an embodiment, that the HARQ process ID is deployed in the HARQ group so as to obtain the deployment interval which is equal to or greater than L TTI, may be that HARQ process IDs having a same result of 'j mod K' are deployed in same HARQ group. Here, when 'N mod K=0,' 'min(S)=k' may be satisfied because a minimum value of the deployment interval S of the HARQ process ID belonging to same HARQ group, and 'K=min (S)≥L' may be satisfied by the above-described assumption that the deployment interval S of the HARQ group is equal to or greater than the HARQ processing time L. Therefore, when K HARQ groups is selected to satisfy 'K≥L,' the HARQ process ID may be deployed in a specific HARQ group so that the deployment interval S of same HARQ groups may be equal to or greater than L TTI.

Here, when 'N mod K≠0', it is possible to operate in various ways.

First, a method of deploying HARQ process IDs in an HARQ group may be used as an existing method. In this case, the minimum value of the deployment interval S of the HARQ groups may be set to N mod K. Therefore, K may be selected such that 'N mod K≥L' is satisfied. When 'N mod K=αK (0<α<1)' is satisfied, K may be selected such that 'K≥L/α' is satisfied. Because implementation complexity increases as the number of HARQ groups, which is K, increases, it is advantageous to keep K as small as possible, K may be set to the minimum value when K is selected so that α is as close as possible to 1.

In the case of 'N mod K≠0,' K may be selected so that α is as close as possible to 1 as another method. When an operation comparing 'N mod K' with K/2 is added to the operation for deploying the HARQ process IDs in the HARQ group, the minimum value of the deployment interval of the HARQ group may be always more than K/2. When the operation for deploying the HARQ process ID #j in the HARQ group 'j mod K' is only used, '0<α<1' is satisfied. When the operation comparing 'N mod K' with K/2 is added to the operation for deploying the HARQ process ID #j in the HARQ group 'j mod K,' the HARQ group is deployed to keep always '½≤α<1.'

When 'N mod K≥K/2' is satisfied, the HARQ process ID #j may be deployed in the HARQ group #(j mod K) among N HARQ process IDs. In this case, the minimum value of the deployment interval S of the HARQ group may be 'N mod K,' and K may be equal to or more than K/2. When 'N mod K<K/2' is satisfied, 'floor (N/K)*K' HARQ process IDs that can be grouped by K among the N HARQ process IDs may be deployed in the HARQ group #(j mod K), and remaining N mod K HARQ IDs may be deployed in the HARQ group #((K/2)+(j mod K)). In this case, the minimum value of the deployment interval of the HARQ group may be (K/2+(j mod K)) and always more than K/2. Therefore, in the case of 'N mod K≠0,' 'min(S)=K/2' may be satisfied because the minimum value of the deployment interval S of the HARQ group is equal to or more than K/2. Because 'min(S)=K/2≥L' is satisfied, the number of HARQ groups K may be selected so that 'K≥2L' is satisfied.

In general, in the case of 'N mod K<K/x (x is a natural number equal to or more than 2),' the deployment interval of the HARQ process may be always equal to or more than K/x when remaining N mod K HARQ process IDs are deployed in the HARQ group #(K*β+(j mod K)) (β may be a real number equal to or more than 1/x and equal to or less than 1).

Here, emphasizing again, the above-described methods for grouping the HARQ process IDs are just embodiments according to the present invention. As above-described embodiments, because the methods for deploying the HARQ process IDs are numerous, it is impossible to explain all of them individually. Therefore, an embodiment for obtaining the deployment interval of L TTI or more per the HARQ group in the situation that the HARQ process ID operates according to TTI as the increase manner or decrease manner is a method for grouping the HARQ process ID using a result of 'j mod K.' The key points may be that the HARQ process IDs having the deployment interval according to a specific situation are deployed in same HARQ group and the deployment interval S of the HARQ process IDs belonging to same HARQ group is more than the HARQ processing time L. Therefore, if there are different deployment intervals between HARQ process IDs, the deployment interval S of the HARQ process IDs belonging to same HARQ group may be grouped equal to or more than L TTI based on another form (e.g., another equation, another table, or separate signaling, etc.) which does not depend on the result of 'j mod K.'

In summary, the HARQ process IDs may be mapped to the HARQ group by the HARQ group mapping function, and then the HARQ process IDs may be grouped. Here, inputs of the HARQ group mapping function may be the HARQ process ID and the HARQ processing time, and outputs of the HARQ group mapping function may be the HARQ group. In this case, the deployment interval of the HARQ groups may be equal to or more than the HARQ processing time. The above-described embodiments may be that the HARQ group mapping function is 'j mod K.'

In addition, if there is no mention in all situations described in the present invention, it is always possible to freely use a method that the deployment interval of the HARQ group is set to more than L TTI using empty TTI.

Here, the operation method of the first communication node may comprise receiving a transport block from a second communication node; performing a demodulation operation on the transport block; performing a demapping operation on the demodulated transport block; storing the demapped transport block in the HARQ memory group; and performing a decoding operation on the demapped transport block stored in the HARQ memory group.

Here, the demapped transport block may be stored in the HARQ memory group belonging to the HARQ group in which a HARQ process ID of the demapped transport block is deployed.

Here, the step for performing the decoding operation may further comprise identifying a HARQ memory group storing the demapped transport block based on a HARQ process ID of the demapped transport block; obtaining the demapped transport block from the identified HARQ memory group; and performing a decoding operation on the obtained demapped transport block.

In order to achieve the objective of the present disclosure, an operation method of a first communication node may comprise configuring parameters to be used for configuring one or more hybrid automatic repeat request (HARQ) groups; and transmitting the parameters to a second communication node; wherein each of the one or more HARQ groups may include a HARQ memory group, a memory controller group controlling the HARQ memory group, and a decoder group performing a decoding based on data stored in the HARQ memory group by accessing the HARQ memory group through the memory controller group, and wherein the parameters may include at least one of a total number of the one or more HARQ groups, a total number of HARQ process IDs belonging to the one or more HARQ groups, a total number of decoders belonging to the one or more HARQ groups, an deployment interval of the one or more HARQ groups, at least one HARQ process ID deployed in the one or more HARQ groups, and a HARQ processing time of a single HARQ process.

Here, the parameters may be transmitted through at least one of a radio resource control (RRC) signaling procedure, a system information transmission procedure, and a control information transmission procedure.

Here, a deployment interval of HARQ process IDs belonging to each of the one or more HARQ groups may be equal to or greater than the HARQ processing time.

Here, when the HARQ processing time is L, a total number of the one or more HARQ groups is K, the deployment interval of the HARQ group is S, a total number of HARQ process IDs is N, and an arbitrary HARQ process ID among N HARQ process IDs is j, HARQ process IDs having a same result of (j mod K) are deployed in a same HARQ group so that the deployment interval is equal to or more than L TTI.

In order to achieve the objective of the present disclosure, a communication node may comprise a processor; and a memory storing at least one command which is executed by the processor, wherein the at least one command may be executed to configure one or more hybrid automatic repeat request (HARQ) groups; and arrange at least one HARQ process identifier (ID) in each of the one or more HARQ groups, wherein each of the one or more HARQ groups may include a HARQ memory group, a memory controller group controlling the HARQ memory group, and a decoder group performing a decoding based on data stored in the HARQ memory group by accessing the HARQ memory group through the memory controller group, and wherein an deployment interval of HARQ process IDs belonging to each of the one or more HARQ groups may be equal to or greater than a HARQ processing time of a single HARQ process.

Here, the one or more HARQ groups may be configured based on a total number of the one or more HARQ groups, a total number of the HARQ process IDs belonging to the one or more HARQ groups, a total number of decoders belonging to the one or more HARQ groups, a deployment interval of the one or more HARQ groups, at least one HARQ process ID deployed in the one or more HARQ groups, and the HARQ processing time.

Here, when the HARQ processing time is L, a total number of the one or more HARQ groups is K, the deployment interval of the HARQ group is S, a total number of HARQ process IDs is N, and an arbitrary HARQ process ID among N HARQ process IDs is j, HARQ process IDs having a same result of (j mod K) are deployed in a same HARQ group so that the deployment interval is equal to or more than L TTI.

Here, when 'N mod K=0,' 'min(S)=k' may be satisfied because a minimum value of the deployment interval S of the HARQ process ID belonging to same HARQ group, and 'K=min(S)≥L' may be satisfied by the above-described assumption that the deployment interval S of the HARQ group is equal to or greater than the HARQ processing time L. Therefore, when K HARQ groups is selected to satisfy 'K≥L,' the HARQ process ID may be deployed in a specific HARQ group so that the deployment interval S of same HARQ groups may be equal to or greater than L TTI.

Here, when 'N mod K≠0', it is possible to operate in various ways.

First, a method of deploying HARQ process IDs in an HARQ group may be used as an existing method. In this case, the minimum value of the deployment interval S of the HARQ groups may be set to N mod K. Therefore, K may be selected such that 'N mod K≥L' is satisfied. When 'N mod K=αK (0<α<1)' is satisfied, K may be selected such that 'K≥L/α' is satisfied. Because implement complexity increases as the number of HARQ groups K increase, it is advantageous to keep K as small as possible, K may be set to the minimum value when K is selected so that α is as close as possible to 1.

As another method, K may be selected so that α is as close as possible to 1. When an operation comparing 'N mod K' with K/2 is added to the operation for deploying the HARQ process IDs in the HARQ group, the minimum value of the deployment interval of the HARQ group may be always more than K/2. When the operation for deploying the HARQ process ID #j in the HARQ group 'j mod K' is only used, '0<α<1' is satisfied. When the operation comparing 'N mod K' with K/2 is added to the operation for deploying the HARQ process ID #j in the HARQ group 'j mod K,' the HARQ group is deployed to keep always '½≤α<1.' When 'N mod K≥K/2' is satisfied, the HARQ process ID #j may be deployed in the HARQ group #(j mod K) among N HARQ process IDs. In this case, the minimum value of the deployment interval S of the HARQ group may be 'N mod K,' and K may be equal to or more than K/2. When 'N mod K<K/2' is satisfied, 'floor (N/K)*K' HARQ process IDs that can be grouped by K among the N HARQ process IDs may be deployed in the HARQ group #(j mod K), and remaining N mod K HARQ IDs may be deployed in the HARQ group #((K/2)+(j mod K)). In this case, the minimum value of the deployment interval of the HARQ group may be (K/2+(j mod K)) and always more than K/2. Therefore, in the case of 'N mod K≠0,' 'min(S)=K/2' may be satisfied because the minimum value of the deployment interval S of the HARQ group is equal to or more than K/2. Because 'min(S)=K/2≥L' is satisfied, the number of HARQ groups K may be selected so that 'K≥2L' is satisfied.

In general, in the case of 'N mod K<K/x (x is a natural number equal to or more than 2),' the deployment interval of the HARQ process may be always equal to or more than K/x when remaining N mod K HARQ process IDs are deployed in the HARQ group #(K*β+(j mod K)) (β may be a real number equal to or more than 1/x and equal to or less than 1).

According to the present invention, an HARQ memory for storing a transport block corresponding to a HARQ process identifier can be divided into one or more HARQ memory groups considering the execution time for processing the corresponding HARQ process. Also, a memory controller group and a decoder group (or encoder group) corresponding to each of one or more HARQ memory groups may be configured. With this configuration, since the processing operation of the HARQ process is performed independently, a conflict between the processing operations of the HARQ processes may not occur. Therefore, the requirements of high data throughput and low latency can be satisfied in the communication system, and the size of HARQ memory can also be relatively reduced. As a result, the performance of the communication system can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
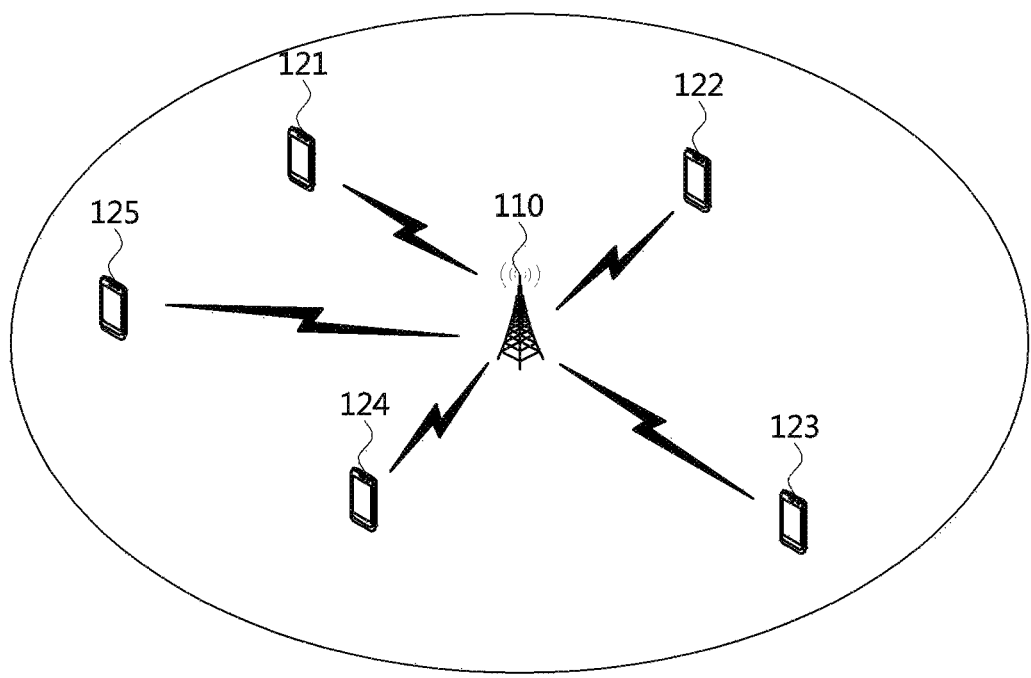
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks. Here, a communication system may mean the communication network.

FIG. 1 is a conceptual diagram illustrating a first embodiment of a communication system.

Referring to FIG. 1, a communication system 100 may comprise a plurality of communication nodes 110, 121, 122, 123, 124, and 125. Also, the communication system 100 may comprise a core network (e.g., a serving gateway (S-GW), a packet data network (PDN) gateway (P-GW), a mobility management entity (MME), and the like). The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard.

For example, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol.

Meanwhile, each of the plurality of communication nodes may have the following structure.

Figure 2:
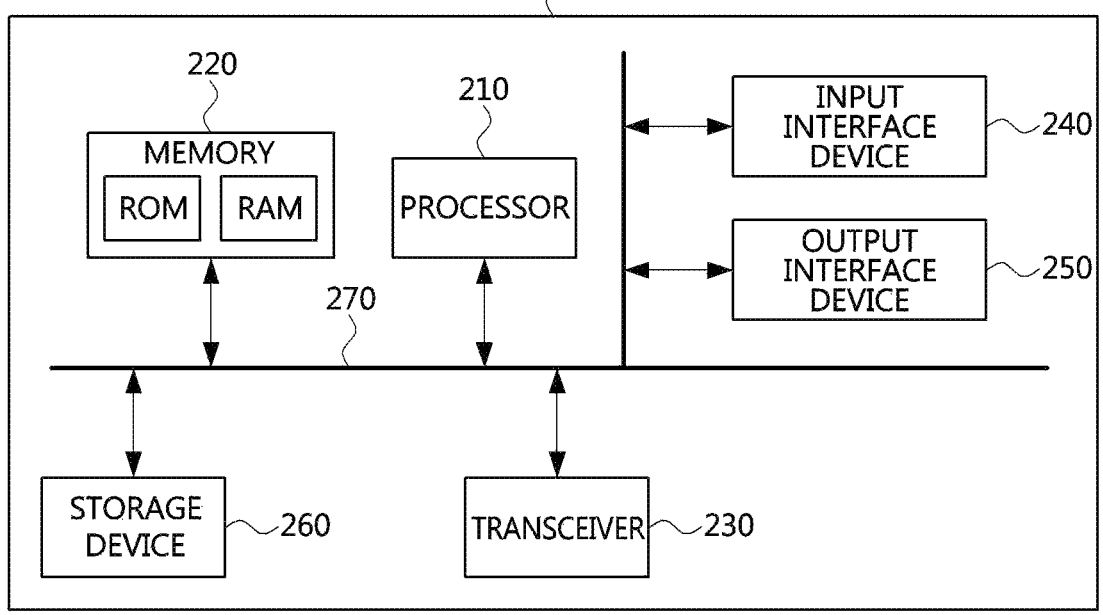
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like.

Each component included in the communication node 200 may communicate with each other as connected through a bus 270. However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, in the communication system 100, the base station 110 may form a macro cell or a small cell, and may be connected to the core network through an ideal backhaul or a non-ideal backhaul. The base station 110 may transmit signals received from the core network to the corresponding terminals 121, 122, 123, 124 and 125, and transmit signals received from the terminals 121, 122, 123, 124, and 125 to the core network. The plurality of terminals 121, 122, 123, 124, and 125 may belong to the cell coverage of the base station 110. The plurality of terminals 121, 122, 123, 124 and 125 may be connected to the base station 110 by performing a connection establishment procedure with the base station 110. The plurality of terminals 121, 122, 123, 124, and 125 may communicate with the base station 110 after being connected to the base station 110.

Also, the base station 110 may perform multiple-input multiple-output (MIMO) transmission (e.g., single user (SU) MIMO, multi user (MU) MIMO, massive MIMO etc.), coordinated multipoint (CoMP) transmission, carrier aggregation (CA) transmission, unlicensed band transmission, device-to-device communication (D2D) (or proximity services (ProSe)), and the like. Each of the plurality of terminals 121, 122, 123, 124, and 125 may perform an operation corresponding to the base station 110, an operation supported by the base station 110, and the like.

The base station 110 may also be referred to as a Node B, an evolved Node B (eNB), a base transceiver station (BTS), a radio remote head (RRH), a transmission reception point (TRP), a radio unit (RU), a roadside unit (RSU), a radio transceiver, an access point, an access node, or the like. Each of the plurality of terminals 121, 122, 123, 124 and 125 may also be referred to as a terminal, a user equipment (UE), an access terminal, a mobile terminal, a station, a subscriber station, a mobile station, a portable subscriber station, a node, a device, an on-broad unit (OBU), or the like.

Next, methods for independently processing a hybrid automatic repeat request (HARQ) process in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Figure 3:
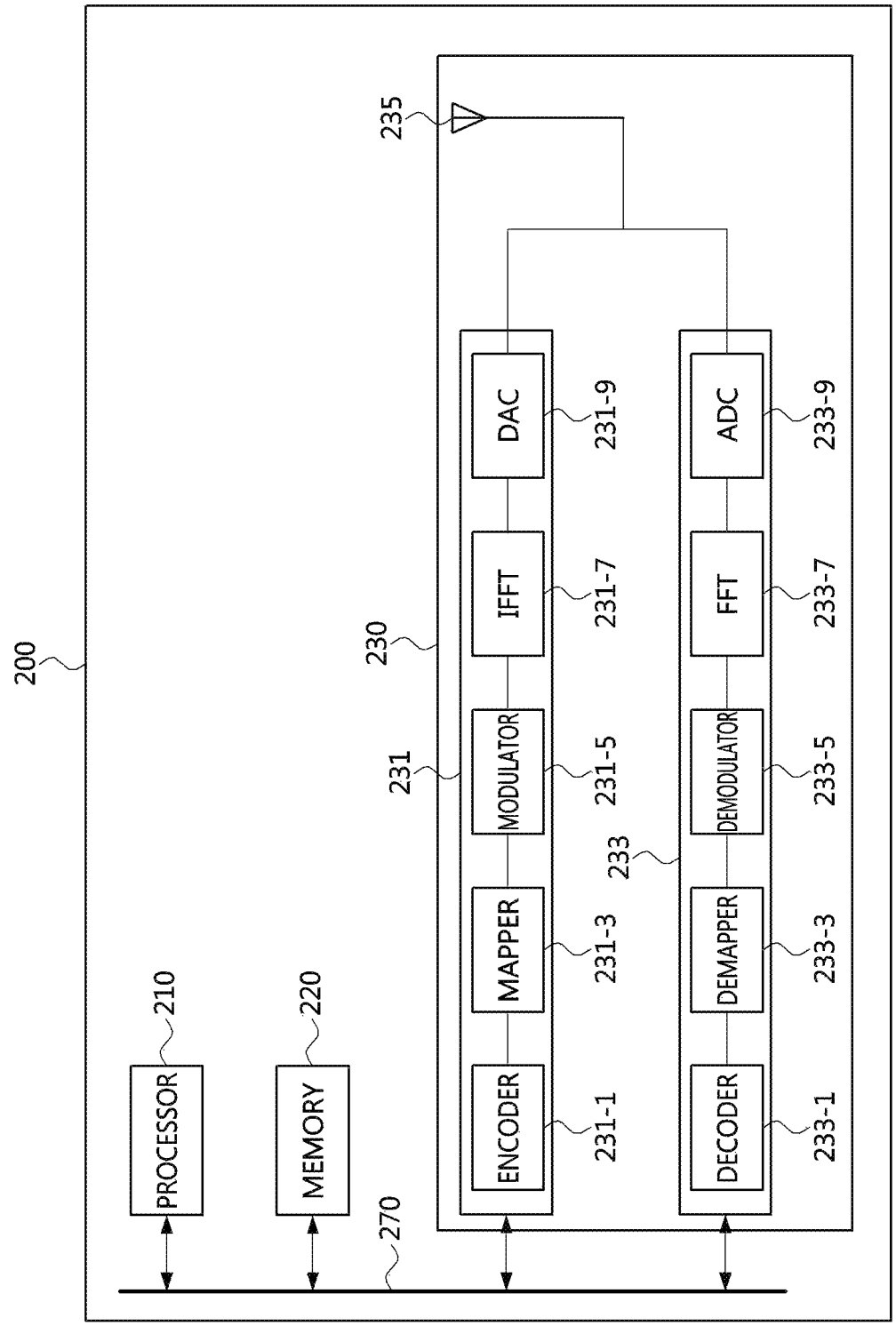
FIG. 3 is a block diagram illustrating a first embodiment of the transceiver included in the communication node of FIG. 2.
Figure 4:
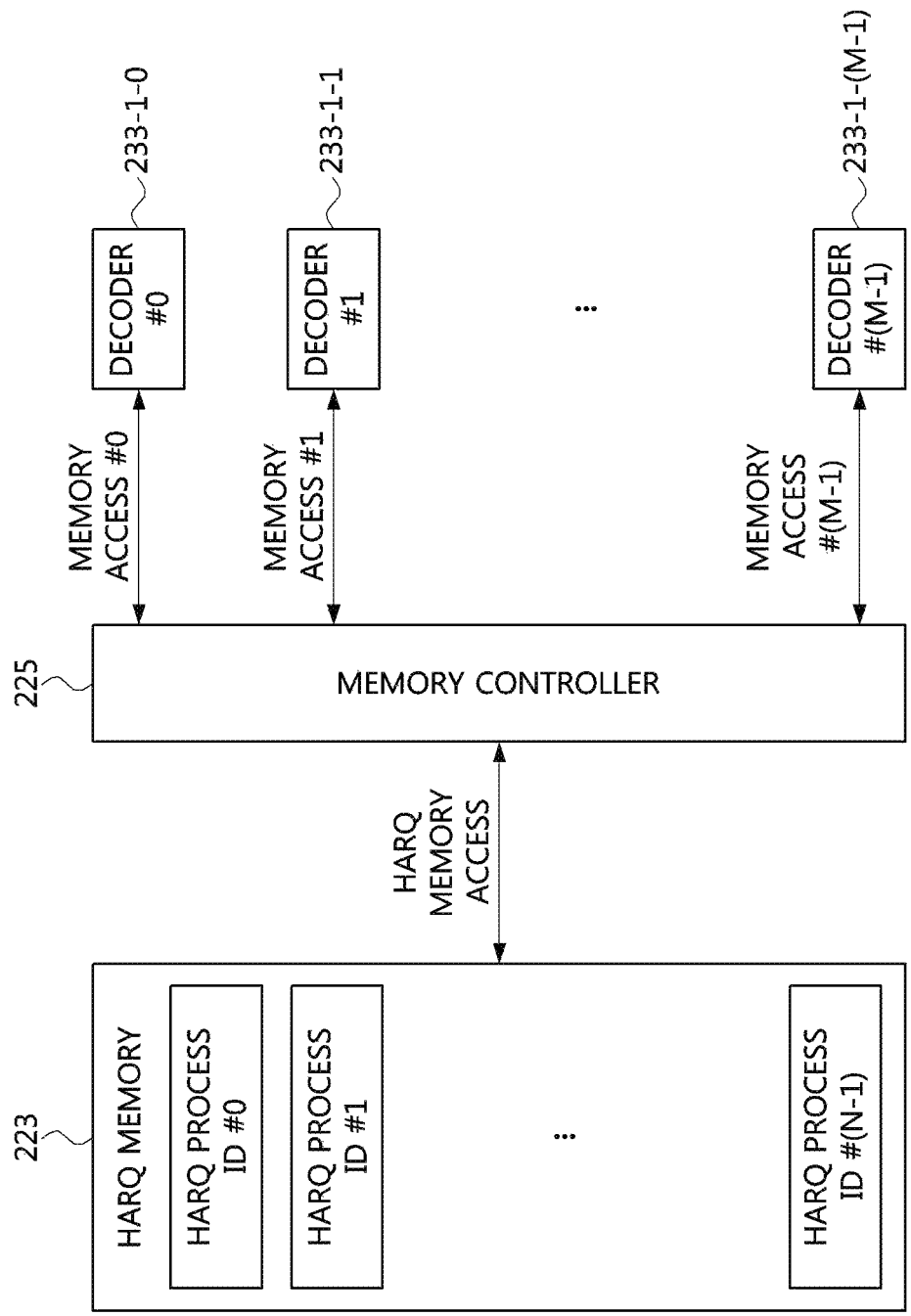
FIG. 4 is a block diagram illustrating a configuration of "decoder-to-memory" in a procedure for processing HARQ processes.

FIG. 3 is a block diagram illustrating a first embodiment of the transceiver included in the communication node of FIG. 2, and FIG. 4 is a block diagram illustrating a configuration of "decoder-to-memory" in a procedure for processing HARQ processes.

Referring to FIGS. 3 and 4, the transceiver 230 of the communication node 200 may include a transmitter 231, a receiver 233, an antenna 235, and the like. The transmitter 231 may include an encoder 231-1, a mapper 231-3, a modulator 231-5, an inverse fast Fourier transform (IFFT) 231-7, a digital-to-analog converter (DAC) 231-9, and the like. The results processed by the components 231-1, 231-3, 231-5, 231-7, and 231-9 included in the transmitter 231 may be stored in the memory 220. The receiver 233 may include a decoder 233-1, a demapper 233-3, a demodulator 233-5, an FFT 233-7, an analog-to-digital converter (ADC) 233-9, and the like. The results processed by the components 233-1, 233-3, 233-5, 233-7, and 233-9 included in the receiver 233 may be stored in the memory 220.

When a HARQ retransmission procedure is performed, received data packets may be stored in a HARQ memory 223 for each HARQ process identifier (ID). For example, when a HARQ process ID is set for each transport block (TB), the HARQ process ID of the TB #0 may be set to '0', the HARQ process ID of the TB #1 may be set to '1', and the HARQ process ID of the TB #(N−1) may be set to 'N−1'. Here, N may be an integer equal to or greater than zero.

The HARQ memory 223 may belong to the memory 220 of the communication node 200 and the results processed by the demapper 233-3 may be stored in the HARQ memory 223. A space indicated by the HARQ process ID #0 in the HARQ memory 223 may be a space in which the TB #0 (e.g., log likelihood ratio (LLR) values for the TB #0) corresponding to the HARQ process ID #0 is stored, a space indicated by the HARQ process ID #1 in the HARQ memory 223 may be a space in which the TB #1 (e.g., LLR values for the TB #1) corresponding to the HARQ process ID #1 is stored, and a space indicated by the HARQ process ID #(N−1) in the HARQ memory 223 may be a space in which the TB #(N−1) (e.g., LLR values for the TB #(N−1)) corresponding to the HARQ process ID #(N−1) is stored.

The decoder 233-1 may be composed of one or more decoders 233-1-0 to 233-1-(M−1). Here, M may be an integer of 0 or more. Each of the one or more decoders 233-1-0 to 233-1-(M−1) may be connected to the HARQ memory 223 via a memory controller 225, may obtain a TB (e.g., LLR values for a TB) corresponding to a HARQ process ID from the HARQ memory 223, and perform decoding on the obtained TB. The memory controller 225 may be referred to as a 'memory arbiter' or a 'memory interface'. When one or more memory access requests are received from the one or more decoders 233-1-0 to 233-1-(M−1), the memory controller 225 may sequentially process the one or more memory access requests, so that the one or more decoders 233-1-0 to 233-1-(M−1) can access the HARQ memory 223 at different times.

Meanwhile, when the HARQ retransmission procedure is performed, the operation of the transmitter 231 may correspond to the operation of the receiver 233 described above. In this case, one or more decoders 233-1-0 through 233-1-(M−1) may correspond to one or more encoders, and the HARQ memory 223 may store the results processed by the one or more encoders.

In the HARQ retransmission procedure, the TBs corresponding to the entire HARQ process IDs may be managed by one HARQ memory 223. In order to satisfy the requirements of high data throughput and low latency in terms of the HARQ memory 223, a high capacity HARQ memory and a simultaneous accessible HARQ memory may be required.

The HARQ retransmission procedure may be controlled by a receiver (e.g., the receiver 233), and a retransmission operation may be performed for each HARQ process ID (e.g., for each TB). The size of the TB may increase with an increase in data throughput, and thus the HARQ memory 223 having large capacity may be required. Also, when a time division duplex (TDD) type frame is used due to a lack of frequency resources, the number of HARQ process IDs managed in the HARQ retransmission procedure may increase because a bidirectional link may not exist. For this reason, the HARQ memory 223 having the large capacity may be required.

However, as the size of the HARQ memory 223 increases, a delay time (e.g., a delay time of processing the HARQ process) increases, which may make it difficult to increase the speed of the circuit. Also, since there is a limit to increase the clock of the circuit, the high data throughput and low latency requirements may not be satisfied. As the size of the HARQ memory 223 increases, the cost of the HARQ memory 223 may increase, so that the implementation cost of the circuit may increase.

Also, a short delay may be required in the 5G communication compared to the conventional communication (e.g., 4G communication). If the size of the TB increases to satisfy the high data throughput requirement, the delay time may increase. In this case, it may be considered to reduce the transmission time interval (TTI) duration to meet the low latency requirement. That is, it may be necessary to speed up the circuit to process the TB with the increased size within the reduced TTI duration. There is a limitation in performance improvement due to the speeding up of the circuit, so that a scheme of using one or more decoders 233-1-0 to 233-1-(M−1) configured in parallel may be considered.

In order for each of the one or more decoders 233-1-0 to 233-1-(M−1) to perform the operation of processing the HARQ process (hereinafter, referred to as 'HARQ processing operation'), it may be necessary to process memory access requests that occur simultaneously in the memory controller 225. For processing of the memory access requests, the complexity of the memory controller 225 and the cost of the HARQ memory 223 may increase. However, when one or more memory access requests occur simultaneously, a conflict between HARQ memory access requests in accordance with one or more memory access requests may occur in the HARQ memory 223. In order to address this problem, the memory controller 225 may generate one HARQ memory access request corresponding to one memory access request through an arbitration operation if one or more memory access requests are present. According to this, since the HARQ processing operations are sequentially performed, the delay time can be increased.

That is, the large capacity HARQ memory 223 may be needed to meet the requirement of high data throughput. Also, in order to meet the requirement of low latency, one or more decoders 233-1-0 to 233-1-(M−1) may be needed, and the arbitration scheme of the memory access requests occurring simultaneously by the one or more decoders 233-1-0 to 233-1-(M−1) may be required.

Figure 5:
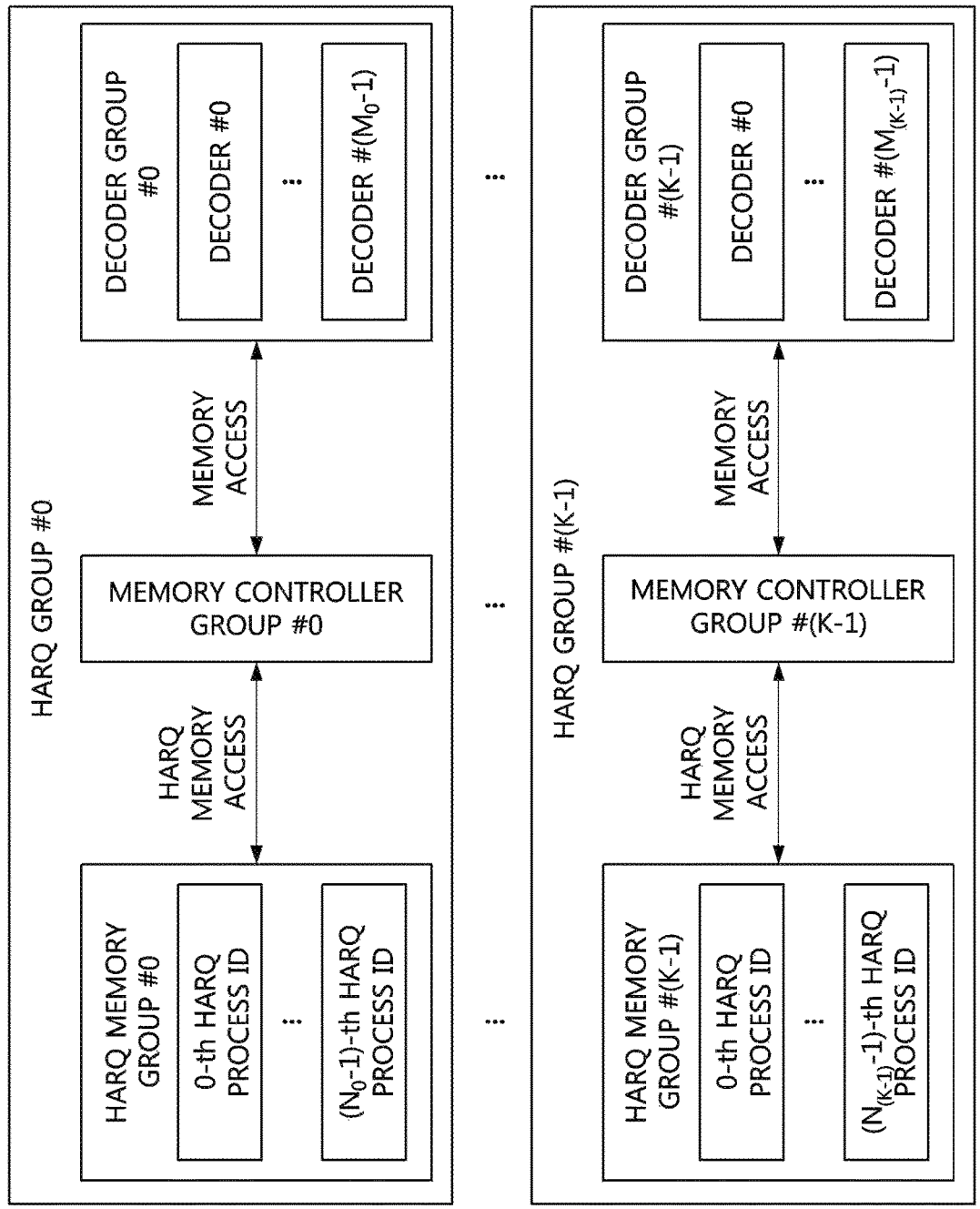
FIG. 5 is a block diagram illustrating a second embodiment of a configuration of "decoder-to-memory" in a procedure for processing HARQ process.

FIG. 5 is a block diagram illustrating a second embodiment of a configuration of "decoder-to-memory" in a procedure for processing HARQ process.

Referring to FIG. 5, one or more HARQ groups (e.g., HARQ groups #0 to #(K−1)) may be configured, and each of the one or more HARQ groups may include a HARQ memory group, a memory controller group, and a decoder group. The HARQ memory group may store TBs corresponding to respective HARQ process IDs, the memory controller group may control the HARQ memory group, and the decoder group may access the HARQ memory group through the memory controller group to decode the TBs stored in the HARQ memory group. For example, the HARQ group #0 may include a HARQ memory group #0, a memory controller group #0, and a decoder group #0, and the HARQ group #(K−1) may include a HARQ memory group #(K−1), a memory controller group #(K−1), and a decoder group #(K−1).

The HARQ group, the HARQ memory group, the memory controller group, and the decoder group (or encoder group) may be configured based on the following parameters (hereinafter referred to as 'HARQ parameters'), and methods for configuring the HARQ parameters will be described in detail.

K: the total number of HARQ groups configured in the transmitter or the receiver $N_K$: the total number of HARQ process IDs belonging to the HARQ group #k (e.g., HARQ group #0 to #(K−1))

N: the total number of HARQ process IDs $M_K$: the total number of decoders (or encoders) belonging to the HARQ group #k (e.g., group #0 to #(K−1))

M: the total number of decoders

S: deployment interval of HARQ group (on a TTI basis)

HARQ process ID in HARQ group

L: execution time of HARQ processing operation (e.g., delay time according to HARQ processing operation) (on a TTI basis)

Meanwhile, in order to minimize simultaneous memory access requests, one or more decoders may be configured as one decoder group, and a HARQ memory group and a memory controller group for each of the decoder groups may be configured. The configuration of the "encoder-to-memory" may be the same as or similar to the configuration of the "decoder-to-memory" shown in FIG. 5. For example, a decoder group may correspond to an encoder group (or an entity group performing L2 functions) of the transmitter, and the encoder group may correspond to one or more encoders (e.g., entities performing L2 functions).

In FIG. 4, since each of the decoders 233-1-0 to 233-1-(M−1) does not know the HARQ process ID to be processed by itself, one or more memory access requests may be generated at the same time. On the other hand, in FIG. 5, since HARQ memory groups (e.g., HARQ process IDs belonging to the same HARQ memory group) assigned to the respective decoder groups are configured, physically-separated HARQ memories may be configured. For example, HARQ memories corresponding to ranges of HARQ process IDs to be processed by the respective decoder groups may be configured, and each of the decoder groups may independently perform the HARQ processing operation. Thus, conflicts between memory access requests can be minimized.

Also, when the interval of the HARQ process IDs belonging to each of the HARQ memory groups is set to be longer than the execution time of the HARQ processing operation (e.g., the delay time of the HARQ processing operation), the HARQ processing operations in each HARQ group may be performed independently so that the complexity of the memory controller group can be reduced.

The Total Number (K) of HARQ Groups

The number K of HARQ groups may be configured within a range that satisfies the following condition 1 below when N mod K=0, and the number K of HARQ groups may be configured with a range that satisfies the following condition 2 below when N mode K≠0.

Condition 1: L≤K≤M
Condition 2: L*K/(N mod K)≤K≤M or xL≤K≤M (x is a natural number equal to or greater than 2)

Also, the total number of each of HARQ memory groups, memory controller groups, and decoder groups may be the same as the total number of HARQ groups.

The Total Number (N) of HARQ Process IDs

The total number (N) of HARQ process IDs may be configured within the maximum value defined in the specification. For example, when the maximum value of the number of HARQ process IDs in the specification is set to 16, the total number N of HARQ process IDs may be set to 16 or less. Also, the total number of HARQ process IDs may be interpreted as the total number of HARQ processes IDs deployed to perform HARQ operations.

The Total Number (M) of Decoders

The total number (M) of decoders included in the receiver 233 (or the total number (M) of encoders included in the transmitter 231) may be configured based on the execution time of the HARQ processing operation of the corresponding decoder (or, encoder). In case that the execution time of the HARQ processing operation for processing a data packet according to the maximum amount of transmission corresponds to L TTIs, M decoders may be configured in the receiver 233. Also, although the minimum repetition cycle of the decoder group is L TTIs, K HARQ groups exist, and thus it is also preferable that the decoder group is repeated every K TTIs, if possible. Accordingly, the number of decoders Mi belonging to the decoder group #i may be 'min(Mi)=M/K'. In general, the value of min(Mi) should be maintained at 1 or more so that the HARQ group can be operated favorably. Here, 'K≤M' can be satisfied. Since the sum of the number of decoders in HARQ groups is equal to the total number of decoders, 'ΣMi=M' can be satisfied.

Deployment (or Assignment) of HARQ Groups

For independent processing of the HARQ processes, the HARQ group may be deployed as follows.

Figure 6:
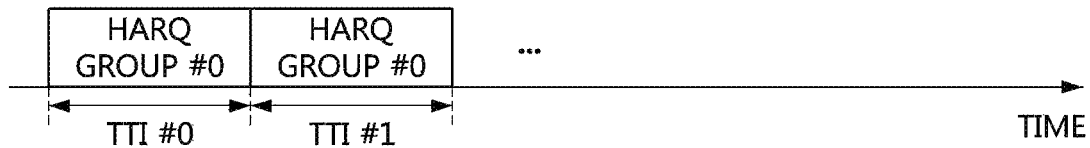
FIG. 6 is a timing chart illustrating a first embodiment of HARQ group deployment.

FIG. 6 is a timing chart illustrating a first embodiment of HARQ group deployment.

Referring to FIG. 6, the deployment interval of the same HARQ group may be 0 TTI, and the HARQ processing operation in the HARQ group #0 may be performed within one TTI. For example, a processing operation for a HARQ process belonging to the HARQ group #0 may be performed in TTI #0 and TTI #1. Here, the HARQ process ID number may be sequentially increased or decreased by one.

Figure 7:
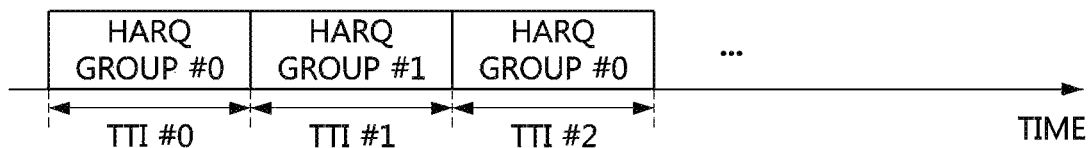
FIG. 7 is a timing chart illustrating a second embodiment of HARQ group deployment.

FIG. 7 is a timing chart illustrating a second embodiment of HARQ group deployment.

Referring to FIG. 7, the deployment interval of the same HARQ group may be 1 TTI, and the HARQ processing operation in each of the HARQ groups #0 and #1 may be performed within 2 TTIs. For example, a processing operation for the HARQ process belonging to the HARQ group #0 may be performed in the TTIs #0 to #1, and a processing operation for the HARQ process belonging to the HARQ group #1 may be performed in the TTIs #1 to #2.

Figure 8:
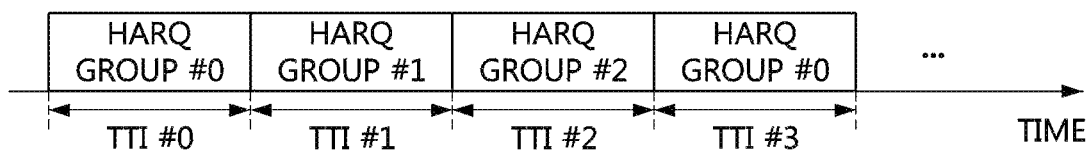
FIG. 8 is a timing chart illustrating a third embodiment of HARQ group deployment.

FIG. 8 is a timing chart illustrating a third embodiment of HARQ group deployment.

Referring to FIG. 8, the deployment interval of the same HARQ group may be 2 TTIs, and the HARQ processing operation in each of the HARQ groups #0 to #2 may be performed within 3 TTIs. For example, a processing operation for the HARQ process belonging to the HARQ group #0 may be performed in the TTIs #0 to #2, a processing operation for the HARQ process belonging to the HARQ group #1 may be performed in the TTIs #1 to #3, and a processing operation for the HARQ process belonging to the HARQ group #2 may be performed in the TTIs #2 to #4.

Also, in case that MIMO-based spatial multiplexing is performed in the communication system, HARQ groups may be set differently for each TB. For example, the HARQ group may be deployed as follows.

Figure 9:
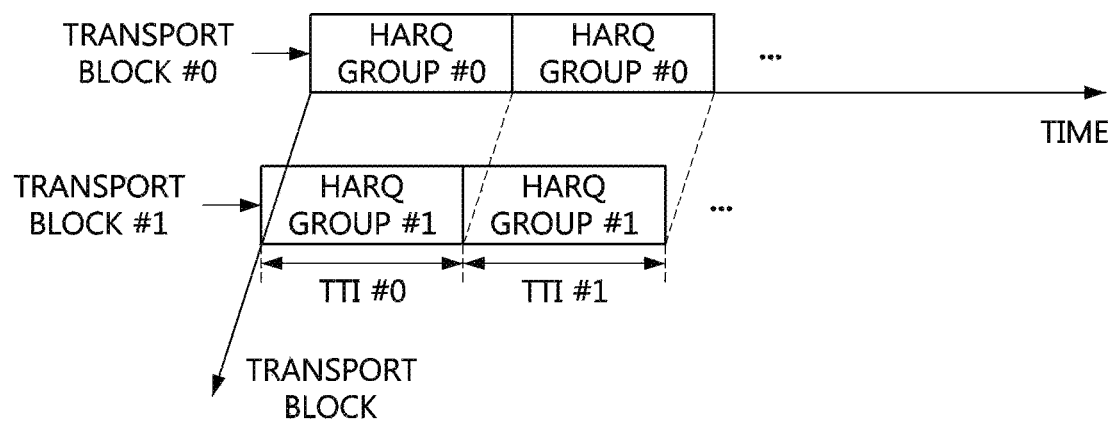
FIG. 9 is a timing chart illustrating a fourth embodiment of HARQ group deployment.

FIG. 9 is a timing chart illustrating a fourth embodiment of HARQ group deployment.

Referring to FIG. 9, the deployment interval of the same HARQ group may be 0 TTI, and different HARQ group may be configured for each TB. For example, a processing operation for the HARQ process belonging to the HARQ group #0 may be performed in the TB #0, and a processing operation for the HARQ process belonging to the HARQ group #1 may be performed in the TB #1.

Figure 10:
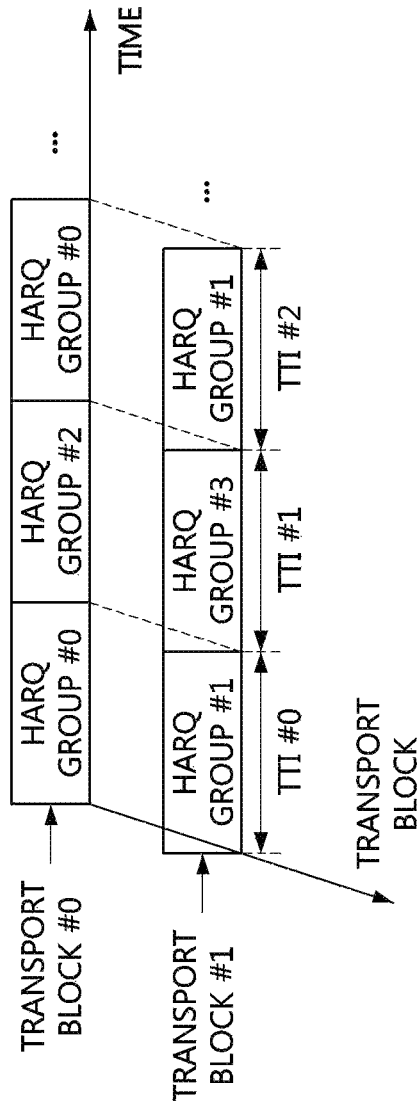
FIG. 10 is a timing chart illustrating a fifth embodiment of HARQ group deployment.

FIG. 10 is a timing chart illustrating a fifth embodiment of HARQ group deployment.

Referring to FIG. 10, the deployment interval of the same HARQ group may be 1 TTI, and different HARQ groups may be configured for each TB. For example, a processing operation for the HARQ process belonging to the HARQ group #0 may be performed in the TTI #0 of the TB #0, and a processing operation for the HARQ process belonging to the HARQ group #2 may be performed in TTI #1 of the TB #0. Also, a processing operation for the HARQ process belonging to the HARQ group #1 may be performed in the TTI #0 of the TB #1, and a processing operation for the HARQ process belonging to the HARQ group #3 may be performed in TTI #1 of the TB #1.

Figure 11:
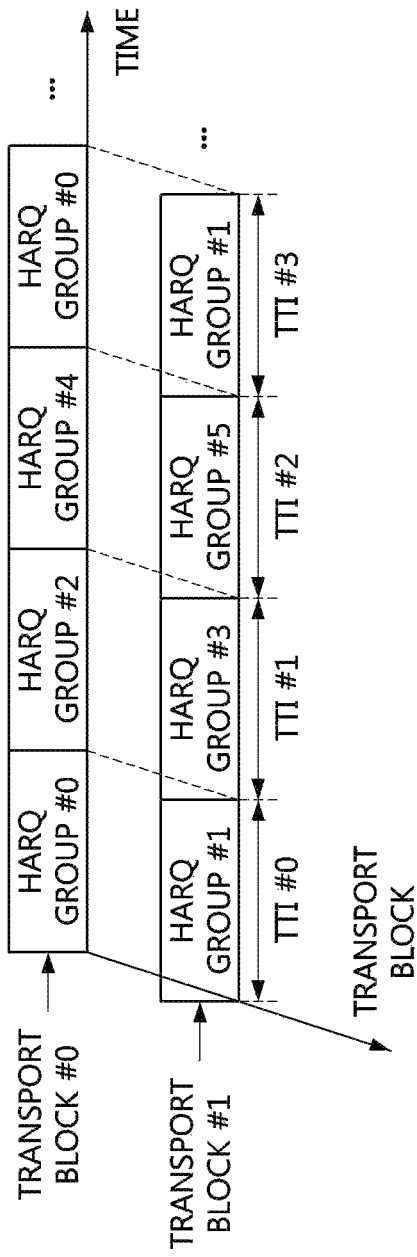
FIG. 11 is a timing chart illustrating a sixth embodiment of HARQ group deployment.

FIG. 11 is a timing chart illustrating a sixth embodiment of HARQ group deployment.

Referring to FIG. 11, the deployment interval of the same HARQ group may be 2 TTIs, and different HARQ groups may be configured for each TB. For example, a processing operation for the HARQ process belonging to the HARQ group #0 may be performed in the TTI #0 of the TB #0, a processing operation for the HARQ process belonging to the HARQ group #2 may be performed in TTI #1 of the TB #0, and a processing operation for the HARQ process belonging to the HARQ group #4 may be performed in TTI #2 of the TB #0. Also, a processing operation for the HARQ process belonging to the HARQ group #1 may be performed in the TTI #0 of the TB #1, a processing operation for the HARQ process belonging to the HARQ group #3 may be performed in TTI #1 of the TB #1, and a processing operation for the HARQ process belonging to the HARQ group #5 may be performed in TTI #2 of the TB #1.

Also, in the case that spatial multiplexing is performed, even if a HARQ group is configured for each TB, additional HARQ group may be implicitly assigned to each TB, and may operate independently of each other. In other words, even if they are configured as the same HARQ group for each TB in FIGS. 9 to 11, they may be implicitly regarded as separate independent HARQ groups.

Figure 15:
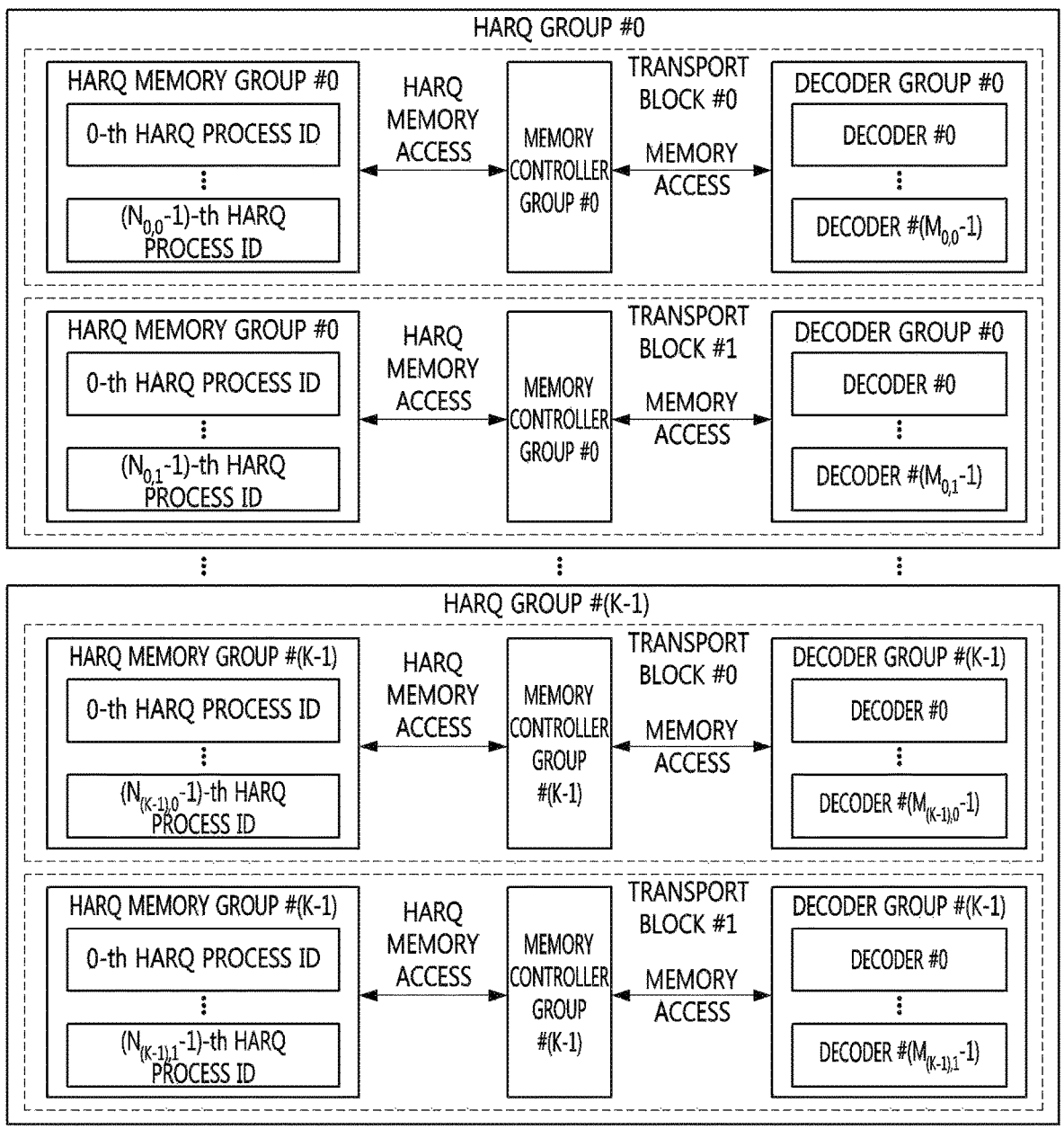
FIG. 15 is a block diagram illustrating a third embodiment of a configuration of "decoder-to-memory" in a procedure for processing HARQ process.

When a HARQ group is configured for each TB in FIGS. 9 to 11, "decoder-to-memory" may be configured as shown in FIG. 15. That is, a HARQ memory group, a memory controller group, and a decoder group for each of the TBs in the HARQ group may be configured.

Deployment (or Assignment) of HARQ Process IDs

In case that the number of HARQ groups is K and the number of any HARQ process ID is j, the HARQ process IDs with the same result from 'j mod K' may be configured to the same HARQ group (e.g., HARQ memory group). In case that the number of HARQ process IDs is N and 'N mod K=0', the execution interval of HARQ processing operations (e.g., processing operations of the same HARQ process ID) causing a collision may be maximized to a multiple of K TTIs.

Figure 13:
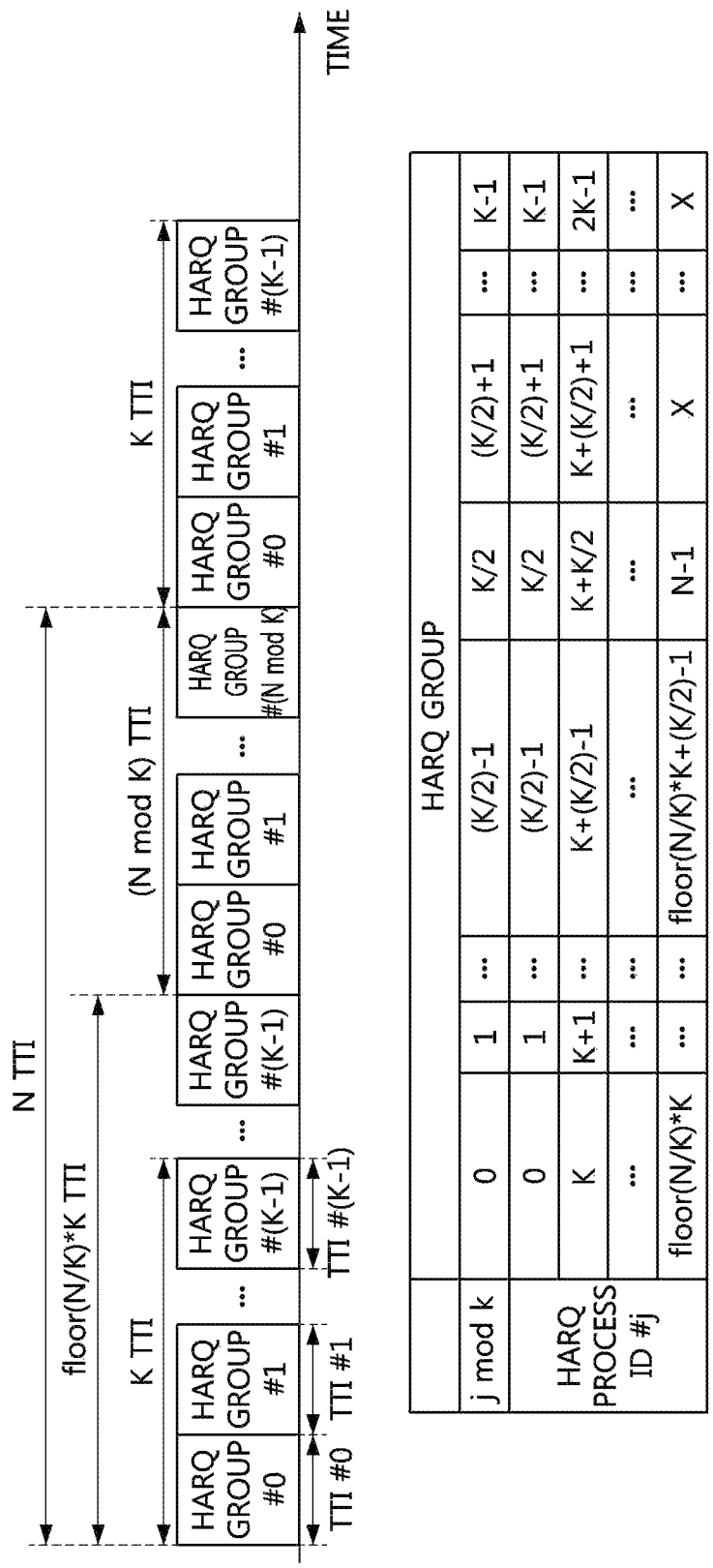
FIG. 13 is a conceptual diagram illustrating a first embodiment of a configuration of HARQ groups when 'N mod K≠0' and 'N mod K≥K/2'.

On the other hand, in case of 'N mod K≠0', when the HARQ process ID #j is deployed in the HARQ group #(j mod K), 'floor (N/K)*K' HARQ process IDs #j that can be grouped by K among the N HARQ process IDs may be deployed in the HARQ group #(j mod K), and the deployment interval between the HARQ process ID #j (e.g., one of the HARQ process IDs #j satisfying 'floor (j/K)=floor (N/K)' when the HARQ process IDs are deployed in a simple increase form for each TTI without an empty TTI) belonging to the last remaining 'N mod K' HARQ groups and the HARQ process ID #j' (e.g., the HARQ process ID #j' satisfying 'floor (j'/K)=0') belonging to the first HARQ group (e.g., one of the first K HARQ memory groups) that can be further grouped by K may be 'N mod K'. In case of 'N mod K≥K/2', the HARQ process ID #j may be deployed in the HARQ group #(j mod K). In this case, the deployment interval of the same HARQ groups may always be K/2 or more. That is, in case that 'N mod K≠0' and 'N mod K≥K/2', the configuration of the HARQ groups may be the same as in FIG. 13. Here, there are the same HARQ groups for each column.

Figure 14:
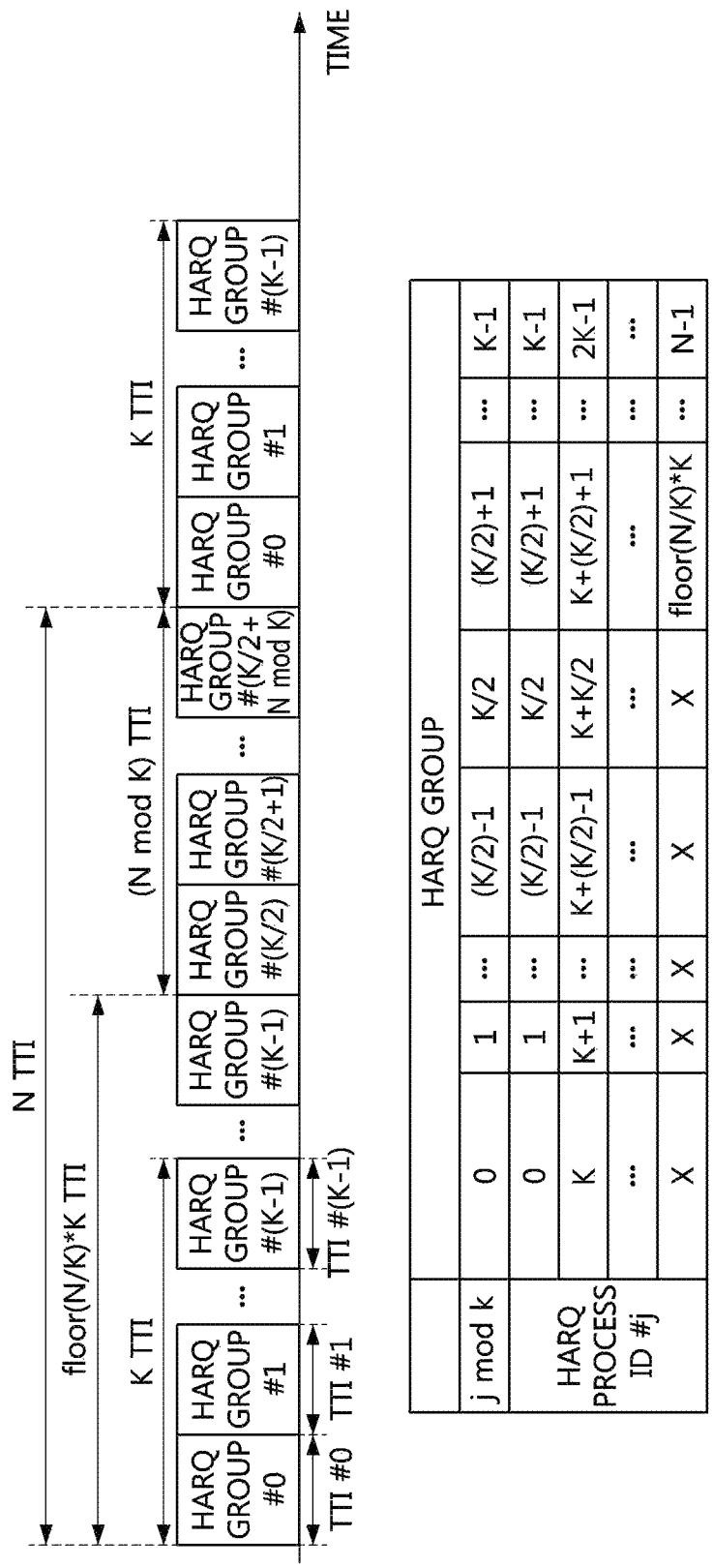
FIG. 14 is a conceptual diagram illustrating a first embodiment of a configuration of HARQ groups when 'N mod K≠0' and 'N mod K<K/2'.

In case of 'N mod K<K/2', 'floor (N/K)*K' HARQ process IDs #j (e.g., #0 to #(floor (N/K)*K−1)) that can be grouped by K among the N HARQ process IDs may be deployed in the HARQ group #(j mod K), and the remaining 'N mod K' HARQ process IDs #j may be deployed in the HARQ group #((K/2)+(j mod K)). In this case, the minimum value of the deployment interval between 'N mod K' last HARQ process IDs #j remaining after being grouped by K and the HARQ process IDs #j' belonging to the first HARQ group that can be further grouped by K again may be (K/2+(j mod K)), which is always larger than K/2. Therefore, 'min(S)=K/2' is established because the minimum value of the deployment interval S of the HARQ groups for all Ks is equal to or larger than K/2 in the state of 'N mod K≠0'. Accordingly, 'min (S)=K/2≥L' should be established, and in this case, the number K of HARQ groups may be selected to satisfy 'K≥2L'. That is, in case that 'N mod K≠0' and 'N mod K<K/2', the configuration of the HARQ groups may be the same as in FIG. 14. Here, there are the same HARQ groups for each column. In this case, since the minimum deployment interval of the HARQ process ID is K/2, not K, the selection range of K may be reduced. Therefore, it may be advantageous that the total number N of HARQ process IDs is set to a multiple of K.

In general, in the case of 'N mod K<K/x (x is a natural number of 2 or more)', if (N mod K) remaining HARQ process IDs are allocated to HARQ group #(K*β+(j mod K)) (β is an arbitrary real number equal to or larger than 1/x and equal to or smaller than 1), the deployment interval of the HARQ processes may always be equal to or larger than K/x.

The deployment interval of HARQ process IDs may be set based on other methods other than the method described above. The deployment interval of the HARQ process IDs may be set according to the operation status of the HARQ retransmission procedure (e.g., the execution time of the HARQ processing operation of the decoder or the encoder). The deployment interval of the HARQ process IDs may be larger than the execution time of the HARQ processing operation. Here, it will be emphasized again that the methods of grouping the HARQ process IDs are merely one example for ease of explanation. As described above, the method of deploying the HARQ process IDs cannot be fully explained because of a large number of situations. Accordingly, in the case where the HARQ process ID is operated in the form of a simple increase or a simple decrease according to the TTI, which is assumed for ease of explanation, an example for obtaining the deployment interval of L TTIs or more for each HARQ group is a method of grouping HARQ process IDs using the result of 'j mod K'.

The above situation assumes that the HARQ process ID #j is located at TTI #t (t=j). If there is an empty TTI or does not operate in a sequential increase form according to the situation, the HARQ process ID #j may be deployed at TTI #t (t≠j). In this case, it may be necessary to consider the TTI #t together with the HARQ process ID #j in order to obtain the deployment interval for each HARQ process ID. In this case, the deployment interval may be determined based on the TTI #t in the HARQ RTT instead of the HARQ process ID #j, the HARQ group may be grouped, and the HARQ process #j deployed in the corresponding TTI may be stored. That is, the HARQ process ID #j may be interpreted as the HARQ process ID #j' of the t-th TTI in the HARQ RTT according to the situation.

That is, the essential point of the present invention is to arrange the HARQ process IDs having the deployment interval in the same HARQ group according to the situation, and to operating HARQ by setting the deployment interval S of the HARQ process IDs belonging to the same HARQ group to be longer than the execution time L of the HARQ processing operation. Therefore, if there is an deployment interval between HARQ process IDs, HARQ process IDs belonging to the same HARQ group may be grouped so that the deployment interval S of them becomes equal to or greater than L TTIs through another form (e.g., another formula, a table, or separate signaling, etc.).

In general, a HARQ process ID may be mapped to a HARQ group by a HARQ group mapping function, and the HARQ process IDs may be grouped accordingly. Here, inputs to the HARQ group mapping function may be the HARQ process ID and the HARQ process processing time, and outputs of the HARQ group mapping function may be the HARQ groups. In this case, the deployment interval of the HARQ groups may be equal to or longer than the HARQ process processing time. The above-described embodiment may be an example of the case that the HARQ group mapping function is 'j mod K'. If the spatial multiplexing is performed, the TB number may also be added as the input to the HARQ group mapping function. Also, when the HARQ groups are changed with time, the TTI number may also be added as the input to the HARQ group mapping function.

For example, in case of 'N=8' and 'K=4', the HARQ process ID in the HARQ group may be configured as shown in Table 1 below. When the execution time of the HARQ processing operation is 1 TTI, the deployment interval of HARQ process IDs belonging to the same HARQ group may be set to be equal to or larger than 1.

TABLE 1

| HARQ group number | HARQ process ID numbers belong to HARQ group |
| --- | --- |
| 0 | 0, 2 |
| 1 | 1, 3 |
| 2 | 4, 6 |
| 3 | 5, 7 |

Execution Time (L) of HARQ Processing Operation

The execution time L of the HARQ processing operation may be set based on the performance of the decoder (or encoder), the size of the TB corresponding to the HARQ process ID, the LLR bit width, and the like.

Meanwhile, methods of setting the HARQ parameters (e.g., K, N, M, S, HARQ process ID in the HARQ group, L, and the like) described above may be as follows.

setting method #1: The HARQ parameters may be predefined in the specification, and the communication node (e.g., transmitter and receiver) may configured the HARQ groups based on the HARQ parameters defined in the specification, and process HARQ processes based on the configured HARQ groups.

setting method #2: 'deployment interval of HARQ group' and 'HARQ process ID in HARQ group' may be signaled to a communication node (e.g., transmitter or receiver). The communication node may estimate (or calculate) the remaining HARQ parameters (e.g., K, N, M, S) based on the signaled HARQ parameters, configure the HARQ groups based on the signaled HARQ parameters and estimated (or calculated) HARQ parameters, and process HARQ processes based on the configured HARQ groups. Alternatively, the communication node may configure the HARQ groups based on the signaled HARQ parameters and the remaining HARQ parameters defined in the specification, and may process the HARQ processes based on the configured HARQ groups.

setting method #3: N may be defined in the specification, in which case the communication node may estimate (or calculate) the remaining HARQ parameters (e.g., M, K, S, etc.) based on N. Therefore, the communication node may configure the HARQ groups based on the HARQ parameters defined in the standard and the estimated (or calculated) HARQ parameters, and may process the HARQ processes based on the configured HARQ groups.

setting method #4: The transmitter may notify at least one of the HARQ parameters to the receiver through at least one of a radio resource control (RRC) signaling procedure, a system information transmission procedure, and a transmission procedure of control information (e.g., downlink control information (DCI)). The receiver may configure the HARQ groups based on the at least one HARQ parameter received from the transmitter, and may process the HARQ processes based on the configured HARQ groups. Here, the HARQ parameters may be set by the transmitter.

setting method #5: the receiver may provide information (e.g., the number of decoders of the receiver, the HARQ process processing time, and the like) that the transmitter does not know among the information necessary for setting the HARQ groups at the transmitter, and the transmitter may configure the HARQ parameters by identifying the configuration of the receiver through the provided information. The transmitter may selectively inform the receiver of necessary information (e.g., mapping relations between the HARQ process IDs and the HARQ groups or mapping relations between the TTI numbers and the HARQ groups) among the configured HARQ parameters.

Figure 12:
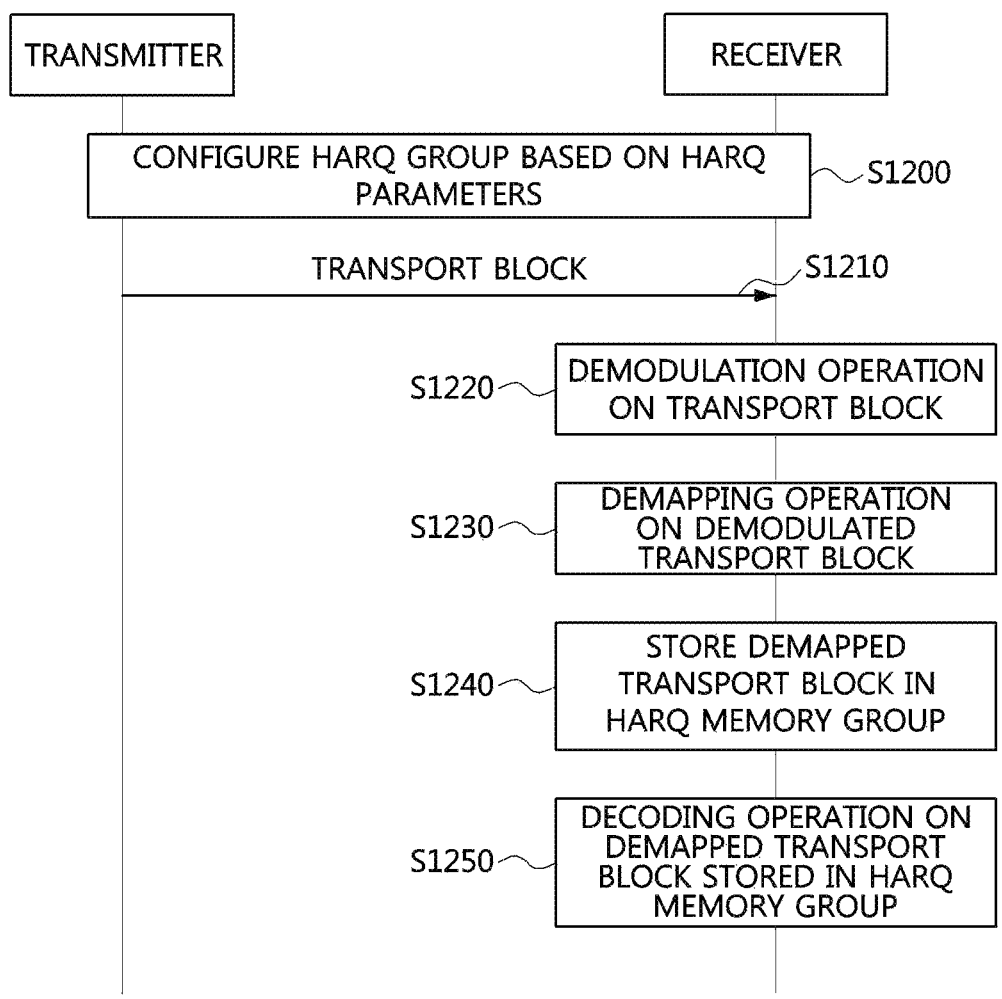
FIG. 12 is a flow chart illustrating a first embodiment of a method of processing a HARQ process.

FIG. 12 is a flow chart illustrating a first embodiment of a method of processing a HARQ process.

Referring to FIG. 12, each of the transmitter and the receiver may be configured to be the same as or similar to the communication node 200 shown in FIG. 2. Also, the transceiver of the transmitter and the receiver may be the same or similar to the transceiver 230 shown in FIG. 3. In the downlink communication, the transmitter may be a base station, and the receiver may be a terminal. In the uplink communication, the transmitter may be a terminal and the receiver may be a base station. In D2D communication, the transmitter may be a first terminal, and the receiver may be a second terminal.

Each of the transmitter and the receiver may configure one or more HARQ groups based on the HARQ parameters (S1200). The HARQ parameters may include K, N, M, HARQ group deployment interval, HARQ process ID in HARQ group, execution time of HARQ processing operation, and the like. The HARQ parameters may be set based on the setting methods #1 to #4 described above, and the HARQ group may be configured to be the same as or similar to the HARQ group shown in FIG. 5. Also, in the step S1200, HARQ process IDs may be deployed (or allocated) to each of the one or more HARQ groups.

The transmitter may transmit a TB (e.g., a data packet) for each HARQ process ID to the receiver (S1210). The receiver may receive the TB from the transmitter and may perform a demodulation operation on the TB (S1220). Also, the receiver may perform a demapping operation on the demodulated TB (S1230), and store the demapped TB in the HARQ memory group (S1240). Here, the demapped TB may be LLR values. The receiver (e.g., the demapper 233-3 of the receiver) may determine the HARQ memory group in which the demapped TB is to be stored based on the HARQ process ID of the demapped TB. For example, if the number of the HARQ process ID of the demapped TB belongs to 0 to $N_0-1$, the receiver (e.g., the demapper 233-3 of the receiver) may store the demapped TB in the HARQ memory group #0 of FIG. 5.

The receiver (e.g., the decoder 233-1 of the receiver) may perform a decoding operation on the demapped TB stored in the HARQ memory group (S1250). For example, the receiver (e.g., the decoder 233-1 of the receiver) may identify the HARQ memory group in which the demapped TB corresponding to the HARQ process ID to be processed is stored, acquire the demapped TB from the corresponding HARQ memory group by performing a memory access request to the identified HARQ memory group, and perform a decoding operation on the acquired demapped TB. If the number of the HARQ process ID to be processed belongs to 0 to $N_0-1$, the receiver (e.g., the decoder 233-1 of the receiver) may make a memory access request to the memory controller group #0 of FIG. 5, acquire the demapped TB corresponding to the HARQ process ID by accessing the HARQ memory group #0 according to the memory access request, and perform a decoding operation on the acquired demapped TB.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system, the operation method comprising:
   configuring one or more hybrid automatic repeat request (HARQ) groups; and
   deploying at least one HARQ process identifier (ID) in each of the one or more HARQ groups,
   wherein each of the one or more HARQ groups includes a HARQ memory group, a memory controller group controlling the HARQ memory group, and a decoder group performing a decoding based on log likelihood ratio (LLR) values for data stored in the HARQ memory group by accessing the HARQ memory group through the memory controller group, and
   wherein a deployment interval of HARQ process IDs belonging to each of the one or more HARQ groups is equal to or greater than a HARQ processing time of a single HARQ process,
   wherein the LLR values for the data with a specific HARQ process ID is stored in the HARQ memory group according to the deployment interval, and the HARQ processing time is a time necessary for transmission and reception operations of the data, and
   wherein the decoder group generates the LLR values decoding the data with the specific HARQ process ID received from a second communication node and stores the LLR values for the data in the HARQ memory group in which the specific HARQ process ID is deployed through the memory controller group.

2. The operation method according to claim 1, wherein parameters used for configuring the one or more HARQ groups are received through at least one of a radio resource control (RRC) signaling procedure, a system information transmission procedure, and a control information transmission procedure.

3. The operation method according to claim 1, wherein the one or more HARQ groups are configured based on a total number of HARQ process IDs, a total number of decoders belonging to the one or more HARQ groups, and the HARQ processing time.

4. The operation method according to claim 1, wherein, when an arbitrary HARQ process ID is j, the HARQ processing time is L, a transport block index is b, a transmission time interval (TTI) number is t, and a mapping function outputs a HARQ group number based on j, L, b, and t, transport blocks having a same result of the mapping function are deployed in a same HARQ group, and
   wherein each of j, L, b, and t is a positive integer.

5. The operation method according to claim 1, wherein, when a total number of the one or more HARQ groups is K and an arbitrary HARQ process ID is j, HARQ process IDs having a same result of (j mod K) are deployed in a same HARQ group, and
   wherein each of j, K, and N is a positive integer.

6. The operation method according to claim 1, wherein an arbitrary HARQ process ID is j, a total number of the one or more HARQ groups is K, a total number of HARQ process IDs is N, x is a natural number equal to or greater than 2, β is a real number equal to or greater than 1/x and equal to or less than 1, and (N mod K)<K/x, each of remaining HARQ process IDs excluding HARQ process IDs already allocated to HARQ groups are deployed in a HARQ group #(K*β±(j mod K)), and
   wherein each of j, K, and N is a positive integer.

7. The operation method according to claim 1, further comprising:
   receiving a transport block from the second communication node;
   performing a demodulation operation on the transport block;
   performing a demapping operation on the demodulated transport block;
   identifying a HARQ memory group storing the demapped transport block based on a HARQ process ID of the demapped transport block;
   obtaining the demapped transport block from the identified HARQ memory group and combining the obtained transport block;
   storing the combined transport block in the HARQ memory group; and
   performing a decoding operation on the combined transport block.

8. The operation method according to claim 1, wherein the configuring one or more HARQ groups further comprises:
   transmitting information on a deployment interval for each HARQ group to the second communication node;
   receiving, from the second communication node, parameters configured based on the information on the deployment interval for each HARQ; and
   configuring the one or more HARQ groups by using the parameters.

9. An operation method of a first communication node in a communication system, the operation method comprising:
   configuring parameters to be used for configuring one or more hybrid automatic repeat request (HARQ) groups; and
   transmitting the parameters to a second communication node;

wherein each of the one or more HARQ groups includes a HARQ memory group, a memory controller group controlling the HARQ memory group, and a decoder group performing a decoding based on log likelihood ratio (LLR) values for data stored in the HARQ memory group by accessing the HARQ memory group through the memory controller group, and wherein the parameters includes at least one of a total number of the one or more HARQ groups, a total number of HARQ process IDs belonging to the one or more HARQ groups, a total number of decoders belonging to the one or more HARQ groups, a deployment interval of the one or more HARQ groups, at least one HARQ process ID deployed in the one or more HARQ groups, and a HARQ processing time of a single HARQ process, wherein a deployment interval of the HARQ process IDs belonging to each of the one or more HARQ groups is equal to or greater than the HARQ processing time, wherein the LLR values for the data with a specific HARQ process ID is stored in the HARQ memory group according to the deployment interval of the HARQ process IDs, and the HARQ processing time is a time necessary for transmission and reception operations of the data, and wherein the decoder group generates the LLR values decoding the data with the specific HARQ process ID and stores the LLR values for the data in the HARQ memory group in which the specific HARQ process ID is deployed through the memory controller group.

10. The operation method according to claim 9, wherein the parameters are configured based on information on the deployment interval of each HARQ group which is received from the second communication node.

11. The operation method according to claim 9, wherein the parameters are transmitted through at least one of a radio resource control (RRC) signaling procedure, a system information transmission procedure, and a control information transmission procedure.

12. The operation method according to claim 9, wherein, when an arbitrary HARQ process ID is j, the HARQ processing time is L, a transport block index is b, a transmission time interval (TTI) number is t, and a mapping function outputs a HARQ group number based on j, L, b, and t, transport blocks having a same result of the mapping function are deployed in a same HARQ group, and wherein each of j, L, b, and t is a positive integer.

13. The operation method according to claim 9, wherein, when a total number of the one or more HARQ groups is K, a total number of HARQ process IDs is N, and an arbitrary HARQ process ID among N HARQ process IDs is j, HARQ process IDs having a same result of (j mod K) are deployed in a same HARQ group, and wherein each of K, N, and j is a positive integer.

14. The operation method according to claim 9, wherein an arbitrary HARQ process ID is j, a total number of the one or more HARQ groups is K, a total number of HARQ process IDs is N, x is a natural number equal to or greater than 2, β is a real number equal to or greater than 1/x and equal to or less than 1, and (N mod K)<K/x, each of remaining HARQ process IDs excluding HARQ process IDs allocated to HARQ groups are deployed in a HARQ group #(K*β±(j mod K)), and wherein each of j, K and N is a positive integer.

15. A communication node in a communication system, comprising:
a processor; and
a memory storing at least one command which is executed by the processor,
wherein the at least one command is executed to configure one or more hybrid automatic repeat request (HARQ) groups and arrange at least one HARQ process identifier (ID) in each of the one or more HARQ groups,
wherein each of the one or more HARQ groups includes a HARQ memory group, a memory controller group controlling the HARQ memory group, and a decoder group performing a decoding based on log likelihood ratio (LLR) values for data stored in the HARQ memory group by accessing the HARQ memory group through the memory controller group, and
wherein a deployment interval of HARQ process IDs belonging to each of the one or more HARQ groups is equal to or greater than a HARQ processing time of a single HARQ process,
wherein the LLR values for the data with a specific HARQ process ID is stored in the HARQ memory group according to the deployment interval, and the HARQ processing time is a time necessary for transmission and reception operations of the data, and
wherein the decoder group generates the LLR values decoding the data with the specific HARQ process ID received from a second communication node and stores the LLR values for the data in the HARQ memory group in which the specific HARQ process ID is deployed through the memory controller group.

16. The communication node according to claim 15, wherein the one or more HARQ groups are configured based on a total number of decoders belonging to the one or more HARQ groups, and the HARQ processing time.

17. The communication node according to claim 15, wherein, when an arbitrary HARQ process ID is j, the HARQ processing time is L, a transport block index is b, a transmission time interval (TTI) number is t, and a mapping function outputs a HARQ group number based on j, L, b, and t, transport blocks having a same result of the mapping function are deployed in a same HARQ group, and
wherein each of j, L, b, and t is a positive integer.

18. The communication node according to claim 15, wherein an arbitrary HARQ process ID is j, a total number of the one or more HARQ groups is K, a total number of HARQ process IDs is N, x is a natural number equal to or greater than 2, β is a real number equal to or greater than 1/x and equal to or less than 1, and (N mod K)<K/x, each of remaining HARQ process IDs excluding HARQ process IDs already allocated to HARQ groups are deployed in a HARQ group #(K*β±(j mod K)), and
wherein each of j, K, and N is a positive integer.

19. The communication node according to claim 15, wherein, when the one or more HARQ groups are configured, the at least one command is further executed to transmit information on a deployment interval for each HARQ group to the second communication node;
receive, from the second communication node, parameters configured based on the information on the deployment interval for each HARQ; and
configure the one or more HARQ groups by using the parameters.

* * * * *